United States Patent
Takach

(10) Patent No.: US 7,109,716 B2
(45) Date of Patent: Sep. 19, 2006

(54) SOIL AND TIME MODELING FOR IMPROVED ELECTROMAGNETIC LOCATORS FOR UNDERGROUND UTILITIES

(75) Inventor: Stephen F. Takach, St. Charles, IL (US)

(73) Assignee: Operations Technology Development, NFP, Des Plaines, IL (US)

( * ) Notice: Subject to any disclaimer, the term of this patent is extended or adjusted under 35 U.S.C. 154(b) by 115 days.

(21) Appl. No.: 10/997,510

(22) Filed: Nov. 24, 2004

(65) Prior Publication Data

US 2006/0109007 A1   May 25, 2006

(51) Int. Cl.
*G01V 3/08* (2006.01)

(52) U.S. Cl. .................. 324/326; 324/347
(58) Field of Classification Search ........ 324/326–329, 324/347, 357–359, 67, 691, 658; 702/2, 702/5
See application file for complete search history.

(56) References Cited

U.S. PATENT DOCUMENTS

| | | | |
|---|---|---|---|
| 5,869,967 A * | 2/1999 | Straus | 324/326 |
| 6,097,189 A * | 8/2000 | Arndt et al. | 324/326 |
| 6,411,095 B1 * | 6/2002 | Chin et al. | 324/326 |
| 6,586,937 B1 | 7/2003 | Goodman | 324/326 |
| 7,034,539 B1 * | 4/2006 | Ueda et al. | 324/357 |

OTHER PUBLICATIONS

Aruliah, D. A., *Fast Solvers for Time-Harmonic Maxwell's Equations in 3D*, University of British Columbia, Aug. 2001.

* cited by examiner

Primary Examiner—Jay M. Patidar
(74) Attorney, Agent, or Firm—Mark E. Fejer

(57) ABSTRACT

A method for locating an object buried in soil in which at least one electromagnetic signal is imparted onto the buried object, thereby generating an electromagnetic field around the buried object. The electromagnetic field as well as at least one electromagnetic property of the soil surrounding the buried object, such as moisture content, temperature and density, is then determined. Data related to the at least one electromagnetic property is transmitted to a data processor in which at least one algorithm is applied to the data, whereby a location of the buried object is determined.

12 Claims, 1 Drawing Sheet

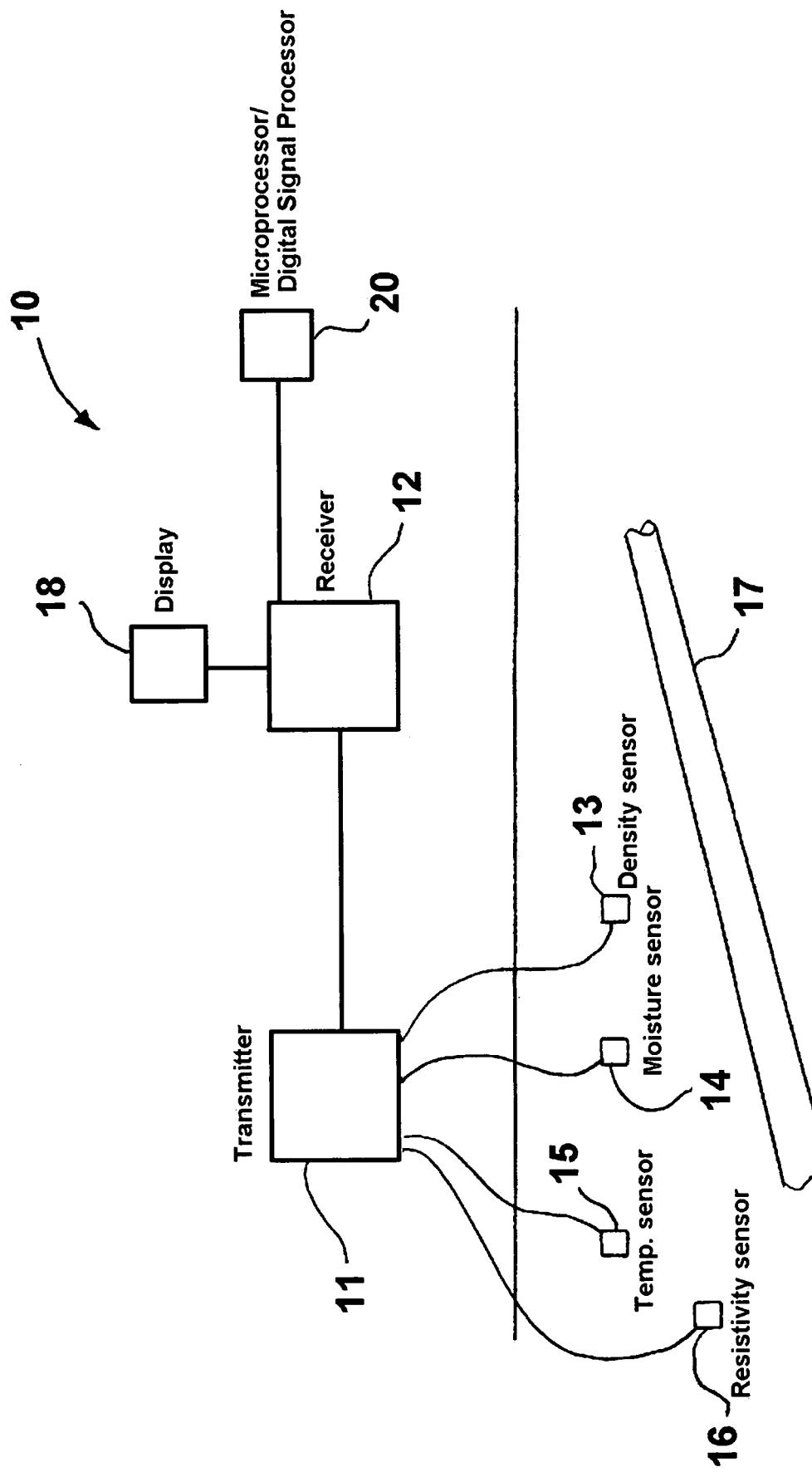

SOIL AND TIME MODELING FOR IMPROVED ELECTROMAGNETIC LOCATORS FOR UNDERGROUND UTILITIES

BACKGROUND OF THE INVENTION

1. Field of the Invention

This invention relates to a method and apparatus for locating objects buried in soil, for example underground utilities, using electromagnetic locators. More particularly, this invention relates to a method and apparatus for improving the precision of electromagnetic locators of underground utilities.

2. Description of Related Art

Utilities buried below the surface of the earth require periodic service and/or repair. Damaged utilities must be located and excavated in order to receive such service. However, location of underground utilities is a traditionally difficult task, particularly in areas containing large networks of underground pipes, wires and other buried objects.

Underground pipelines are generally constructed of either metal or, commonly, plastic such as polyethylene and polyvinyl chloride. Plastic is a preferred pipe material because it is durable, inexpensive, lightweight, inert, easy to manufacture and easy to install. To be detected with traditional underground pipeline location methods requires that the pipe be treated to impart a detectable feature into the plastic.

Electromagnetic locators to determine the location of buried objects such as underground utilities are well known in the art. By way of example, U.S. Pat. No. 6,586,937 B2 to Goodman teaches an apparatus for measuring and detecting a magnetic signature of a magnetically detectable object from a distance, which includes a portable sensor group for detecting the magnetic signature. However, conventional electromagnetic locators rely upon determining the depth and horizontal position of the buried object through the use of a model of a magnetic field that does not take into account all properties of the electromagnetic field and the environment surrounding the buried object. In particular, the model does not account for the time varying properties of the electromagnetic field nor does it account for the electromagnetic properties of the soil in which the buried object is located.

SUMMARY OF THE INVENTION

Accordingly, it is one object of this invention to provide a method and apparatus for electromagnetic location of underground utilities and other buried objects.

It is another object of this invention to provide a method and apparatus for electromagnetic location of underground utilities and other buried objects which takes into consideration all properties of the electromagnetic field.

It is another object of this invention to provide a method and apparatus for electromagnetic location of underground utilities and other buried objects which takes into consideration properties of the environment surrounding the underground utility.

It is another object of this invention to provide a method and apparatus for electromagnetic location of underground utilities and other buried objects which takes into consideration the time varying properties of the electromagnetic field.

It is another object of this invention to provide a method and apparatus for electromagnetic location of underground utilities and other buried objects which takes into consideration the electromagnetic properties of the soil in which the buried object is located.

These and other objects of this invention are addressed by a method and apparatus for locating an object buried in soil in which at least one electromagnetic signal is imparted onto the buried object, thereby generating an electromagnetic field around the buried object, after which the electromagnetic field is detected. At least one electromagnetic property of the soil is determined and the data relating thereto transmitted to a data processor. At least one algorithm is applied to the data whereby the location of the underground utility or buried object is determined. One such algorithm models the electromagnetic properties of the soil surrounding the buried object based upon the collected data. A second algorithm solves Maxwell's equations for the magnetic field in a non-isotropic, inhomogeneous soil medium, including the time-varying nature of the electromagnetic field. A third algorithm determines the uncertainty in the horizontal and vertical location of the buried object.

It will be understood by those skilled in the art that imparting of an electromagnetic signal onto a buried object in accordance with the method of this invention requires the presence of a property, such as electrical conductivity, associated with the buried object, either inherent in the buried object or proximate to the buried object. Thus, for example, association of electrical conductivity with an underground plastic pipeline may be accomplished by disposition of an electrically conductive metal strip on, within or proximate to the underground plastic pipeline.

BRIEF DESCRIPTION OF THE DRAWINGS

These and other objects and features of this invention will be better understood from the following detailed description taken in conjunction with the drawings wherein:

FIG. 1 is a block diagram of an apparatus for electromagnetic location of buried objects in accordance with one embodiment of this invention.

DETAILED DESCRIPTION OF THE PRESENTLY PREFERRED EMBODIMENTS

The invention disclosed herein is an electromagnetic locator for location of buried objects comprising two basic components, a transmitter and a receiver, together with auxiliary instrumentation. Transmitters suitable for imparting an electromagnetic field onto a buried object are known in the art and any such transmitters may be utilized. The auxiliary instrumentation comprises devices for determining the conductivity and dielectric permittivity of the soil proximate the buried object. Soil conductivity may be determined directly by measuring the resistivity (inverse of the conductivity) of the soil and dielectric permittivity of the soil may be measured directly, requiring the use of calibration curves to infer the permittivity at the proper frequencies for locating of buried objects, typically in the range of about 200 Hz to about 200 kHz. Alternatively, the dielectric permittivity of the soil may be determined indirectly from measurements of soil moisture content, soil temperature and soil density. Once collected, the data is transmitted to the receiver, which, in accordance with one embodiment of this invention, comprises modeling means for generating a numerical model of the soil surrounding the buried object based upon the data transmitted to the receiver and modeling means for modeling the electromagnetic field including its time-varying nature. Alternatively, said modeling means may be disposed within the transmitter. In accordance with one embodiment of this invention, the receiver comprises display means for displaying the horizontal and vertical positions of the buried object.

FIG. 1 is a block diagram of an electromagnetic locator 10 having a transmitter 11 operably connected to a receiver 12. In accordance with one preferred embodiment of this invention, communication between transmitter 11 and receiver 12 is by wireless means. Transmitter 11 comprises means for imparting an electromagnetic signal onto buried object 17. In accordance with one embodiment of this invention, the electromagnetic signal is imparted onto the buried object by means of a direct connection to the buried object. In accordance with another embodiment of this invention, the electromagnetic signal is imparted onto the buried object by indirect means.

Connected to transmitter 11 are a plurality of sensors for determining one or more properties of the soil surrounding the buried object 17. In accordance with one embodiment of this invention, said plurality of sensors comprises a soil density sensor 13 adapted to measure the density of the soil, a moisture sensor 14 adapted to measure the moisture content of the soil, a temperature sensor 15 adapted to measure the temperature of the soil, and a resistivity sensor 16 adapted to measure soil resistivity.

Two general classes of methods exist for directly measuring soil resistivity in situ—galvanic and electromagnetic—and either method may be employed in the implementation of this invention. Equipment suitable for determining soil resistivity employing galvanic methods is available from ABEM Instrument AB in Sundbyburg, Sweden, Advanced Geosciences, Inc. located in Austin, Tex., and Geoscan Research located in the United Kingdom. Equipment suitable for determining soil resistivity employing electromagnetic methods is available from Geonics Limited located in Mississauga, Ontario, Canada, Geophex located in Raleigh, N.C., and Geophysical Survey Systems located in North Salem, N.H.

As previously indicated, the method of this invention requires a determination of the soil permittivity. Factors affecting soil permittivity include moisture content, temperature and density of the soil. Accordingly, in accordance with one embodiment of this invention, soil permittivity is inferred from the soil properties on which it depends, i.e. moisture content, temperature and density. Methods for measuring in situ the moisture content of the soil directly, from which the dielectric constant and, thus, soil permittivity can be inferred, include neutron scattering, gamma ray attenuation, NMR resonance techniques and hygrometric techniques, all of which measure humidity from which the moisture content can be inferred. Alternatively, soil permittivity may be measured directly using techniques such as capacitive sensing, time-domain reflectometry, frequency-domain reflectometry, and standing wave amplitude measurement.

Receiver 12 comprises means for detecting the magnetic fields generated around the buried object 17 by transmitter 11. Disposed within receiver 12 in accordance with one embodiment of this invention is a microprocessor and/or digital signal processor 20 for processing data collected by the various sensors. Alternatively, the microprocessor and/or digital signal processor may be contained within the transmitter 11. Receiver 12 in accordance with one embodiment of this invention further comprises at least one display 18 for displaying the buried object location information to locator personnel. Ideally, the receiver is a portable unit, thereby enabling locator personnel to easily survey an area in search of buried objects.

Analysis of the magnetic field and soil data obtained to determine the location of a buried object is performed by the microprocessor and/or digital signal processor, which applies a series of algorithms to the data. In particular, upon collection of the data, an algorithm is applied which models the electromagnetic properties of the soil based upon said data. Next, an algorithm for solving Maxwell's equations for the electromagnetic field in a non-isotropic, inhomogeneous soil medium, including the time-varying nature of the electromagnetic field is employed. Suitable algorithms include the Finite Element Method, the Wentzel-Kramers-Brillouin approximation and, a new algorithm, "Fast Solvers for Time-Harmonic Maxwell's Equations in 3D" by Dhavide Arjunan Aruliah (Thesis, University of British Columbia, August 2001). In this latter method, a Helmholtz decomposition of the electric field is used to put Maxwell's equations into a form suitable for discretizing them into a linear system of algebraic equations which can be solved quickly. A third algorithm is then applied, which determines the uncertainty in the horizontal and vertical location of the buried object. Suitable methods for calculating the uncertainty in the location include the Monte Carlo method, Bayesian probability and a combination thereof.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. A method for locating an object buried in soil comprising the steps of:
 imparting at least one electromagnetic signal onto said buried object, generating an electromagnetic field around said buried object;
 detecting said electromagnetic field;
 determining conductivity and dielectric permittivity of said soil;
 transmitting data related to said conductivity and dielectric permittivity to a data processor; and
 applying at least one algorithm to said data whereby a location of said buried object is determined.

2. A method in accordance with claim 1, wherein said conductivity is determined from measuring resistivity of said soil.

3. A method in accordance with claim 1, wherein said dielectric permittivity is determined from measuring at least one property of said soil selected from the group consisting of moisture content, density, temperature, and combinations thereof.

4. A method in accordance with claim 1, wherein said at least one algorithm produces a model of at least one electromagnetic property of said soil.

5. A method in accordance with claim 1, wherein said at least one algorithm solves Maxwell's equations for said electromagnetic field in said soil including a time-varying nature of said electromagnetic field.

6. A method in accordance with claim 1, wherein said at least one algorithm determines an uncertainty in a surface and depth location of said buried object.

7. A method in accordance with claim 1, wherein said buried object is an underground utility.

8. A method in accordance with claim 7, wherein said at least one electromagnetic signal is generated by direct connection with said underground utility.

9. An apparatus for locating an object buried in soil, said apparatus comprising:
- transmitter means for generating an electromagnetic signal onto said object;
- receiver means for detecting an electromagnetic field disposed around said buried object;
- measurement means for measuring at least one property of said soil selected from the group consisting of moisture content, density, temperature, dielectric permittivity, resistivity, and combinations thereof;
- modeling means for modeling at least one electromagnetic property of said soil; and
- solution means for solving Maxwell's equations for said electromagnetic field.

10. An apparatus in accordance with claim 9 further comprising calculation means for calculating an uncertainty in a location of said buried object.

11. An apparatus in accordance with claim 9 further comprising display means for displaying a location of said object operably connected to one of said transmitter and said receiver.

12. A method for locating an object buried in soil comprising the steps of:
- imparting at least one electromagnetic signal onto said buried object, generating an electromagnetic field around said buried object;
- detecting said electromagnetic field;
- determining conductivity and dielectric permittivity of said soil;
- transmitting data related to said conductivity and dielectric permittivity to a data processor;
- applying a first algorithm to said data, producing a model of at least one electromagnetic property of said soil;
- solving equations for said electromagnetic field in said soil, including a time-varying nature of said electromagnetic field;
- determining a location of said buried object; and
- determining an uncertainty in a horizontal and vertical location of said buried object.

* * * * *